Figure 1:
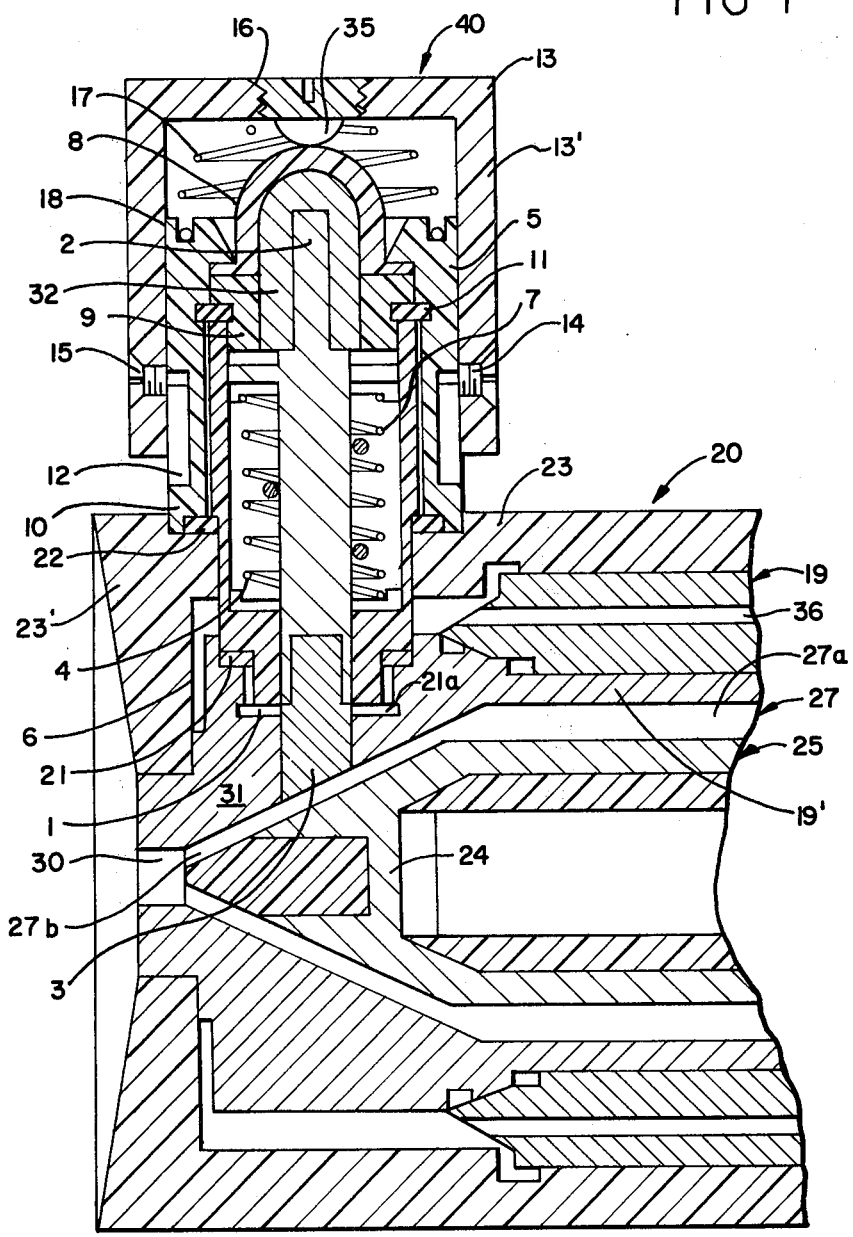

United States Patent [19]

Garlanov et al.

[11] 4,370,539
[45] Jan. 25, 1983

[54] DEVICE FOR THE MANUAL START-UP OF A PLASMA TORCH

[75] Inventors: Dimo T. Garlanov; Marin G. Beloev; Vladimir P. Hlebarov; Mariana V. Kolarova; Ivan V. Vangelov, all of Sofia, Bulgaria

[73] Assignee: NPK za Kontrolno Zavarachni Raboti, Sofia, Bulgaria

[21] Appl. No.: 194,886

[22] Filed: Oct. 7, 1980

[51] Int. Cl.³ ............................................. B23K 9/16
[52] U.S. Cl. ...................... 219/121 PW; 219/121 PP; 219/121 P; 219/121 PR; 219/75; 315/331; 315/330
[58] Field of Search ................ 219/121 PM, 121 PR, 219/121 PW, 121 PP, 121 P, 121 PT, 76.16, 130.4, 137 R, 75, 74; 313/231.3; 315/111.2, 330, 331

[56] References Cited

U.S. PATENT DOCUMENTS 3,705,326 12/1972 Ashcraft et al. ............... 315/331
3,876,908 4/1975 Chan .................................. 315/331

*Primary Examiner*—M. H. Paschall

[57] ABSTRACT

Device for the manual start-up of a plasmotron. The device has a spring biased plunger which constitutes an electrode which selectively bridges the anode and cathode of the plasmotron and creates an arc between the anode and cathode when it is released so as to be retracted by the spring. The device is provided with an automatic lock which secures the plunger in its outer, retracted position and must be released manually to prevent unintended operation of the start-up device.

3 Claims, 2 Drawing Figures

DEVICE FOR THE MANUAL START-UP OF A PLASMA TORCH

This invention relates to a device for the manual start-up of a plasma torch or plasmatron, and in particular a plasmatron for working under water; the plasmatron of the invention can also be employed in ship building, welding in general, and in other engineering areas.

A device for plasmatron start-up is known which consists of a hollow, closed metallic cylinder, in the front end of which a small directed cylindrical opening is machined. In the hollow cylinder on an insulator there is installed a rod-shaped electrode with a tip made of a high melting point metal. The hollow cylinder is built in the body of the cathode holder of the plasmatron in such a manner that the small cylindrical opening through the hollow cylinder is connected to the space between the nozzle and the cathode of the plasmatron. To the hollow cylinder and the rodshaped electrode there are connected wires from the opposite sides of a high capacity capacitator.

A disadvantage of this device is that it works with alternating current, and as a result cannot be used for plasmatron which are intended for underwater use.

The present invention has among its objects the provision of a device for the manual start-up of a plasmatron, which can insure repeated manual start-ups of a pilot plasmatic arc between the cathode and the nozzle of the plasmatron with only the supply voltage applied between them both for the process carried out under normal conditions (in air) and the process carried out under water. The device is provided with an interlock which prevents an unintended repetition of the start-up operation.

The object of the invention in achieved by a device having a hollow cylinder, in which an electrode with an unmelting tip is disposed. A cylindrical spring is placed around the electrode, the spring being confined between an upper and a lower washer which are connected by a conductor. At the upper end of the electrode there is mounted an elastic cylinder on an insulating sleeve which is affixed to the hollow cylinder by means of an insulating cylinder. On the outer surface of the insulating cylinder there are two oppositely disposed bayonet or r-shaped slots. The vertical part of the two r-shaped channels are disposed in the same diametral plane, while the horizontal parts thereof project in opposite tangential directions in a transverse plane. Such channels receive pins or screws which move with the electrode, the channels and pins constituting bayonet locks. A non-metallic cylinder, which is closed at its upper end, is disposed on the insulating cylinder. Threaded openings receiving screws are provided in the non-metallic cylinder. In the upper closing surface of a non-metallic cup-shaped operating member there is disposed a large screw which is connected to a frusto-conical spring, the large end of the spring being affixed in a channel provided in the upper end of the insulating cylinder.

The advantages of the device of the invention are that it can be used for the start-up of plasmatrons which work in air as well as for plasmatrons which work under water. Aside from that, after the starting of the plasmatic arc, the device automatically returns to its initial position at which there is provided a manually operated locking means, the bayonet locks which prevents unintended start-up of the plasmatron.

Figure 2:
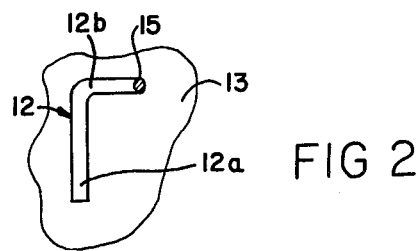

A preferred embodiment of the device according to the invention is shown in the attached drawings, in which FIG. 1 is a view in longitudinal section through the starting device, which is shown mounted on a fragmentarily illlustrated plasmotron, and FIG. 2 is a view in section taken along line 2—2 in FIG. 1.

The plasmatron, which is generally designated by the reference character 20, has an outer metallic body portion 19 and an inner metallic body portion 25, such two parts of the body 20 being coaxial of each other and electrically insulated from each other. Parts 19 and 25 of the body, as is well known in the art, are connected to a D.C. electric source, the forward, nozzle-forming portion 24 of part 25 of the plasmatron being the cathode and the confronting forward portion 31 of part 19 of the body 20 of the plasmatron being the anode. The body of the plasmatron is substantially covered by a non-metallic, electrically insulating sheath 23 which has an annular radially inwardly extending flange or hood 23' at its forward end.

Gas under pressure is supplied to an annular gas passage 27 in the plasmatron, such passage having a cylindrical rear portion 27a and a forward, frusto-conical portion 27b which leads to an axially disposed plasma discharge opening 30 at the forward of the plasmatron.

The manual start-up device for the plasmatron 20 is designated generally by the reference character 40. Device 40 has a hollow cylindrical member 1 made of metal which is screwed into radial opening in part 19 of the plasmatron and is sealed thereto by an annular gasket 21 and a further gasket 21a interposed between the lower end of member 1 and a step in the radial bore in body 19 which receives body 1. A start-up electrode 2 having an upper end of reduced diameter and a non-melting replaceable lower tip 3 is slidably mounted within the member 1. Around the electrode 2 there is telescoped a coil compression spring 4, the spring 4 being held between an upper metal guide washer 5 and a lower metal guide washer 6, the two washers being electrically connected by a conductor 7 coiled around the electrode 2. At the upper end of the electrode 2 there is mounted an elastic electrically insulating cylinder 10. A short electrically insulating sleeve 9, having an annular flange on its upper end, has its lower end telescoped into the upper end of the hollow cylinder 1. The hollow cylinder 1, the insulating sleeve 9, and the insulating cylinder 10 are sealed together by an O-shaped ring 11 which is disposed in facing annular grooves in members 9 and 10 and which sealingly engages the upper end of member 1. On the outer surface of the insulating cylinder 10 there are machined two r-shaped channels or bayonet slots 12 which are disposed opposite to each other. The vertical parts 12a of channels 12 lie in the same diametral plane, while the horizontal parts 12b of such channels extend tangentially in opposite directions in a transverse plane. Over the insulating cylinder 10 there is telescoped an electrically insulating non-metallic cap 13 which has a cylindrical skirt or sidewall 13' and which is closed at its upper end. In the sidewall of the non-metallic cylinder 13 there are threaded openings 14 in which screws 15 are mounted, screws 15 having radially inner ends of reduced diameter which extend into the r-shaped channels 12. In a central threaded opening in the upper end of the non-metallic cap 13 there is disposed a large threaded plug 16 which is made of electrically insulating plastic material, plug 16 being connected to the smaller upper end of a frusto-conical coil torque spring 17. The larger lower end of the spring 17 rests in and is secured against rotation with respect to an annular spring seat 18 which is provided in the upper end of the insulating cylinder 10.

A gasket 22 disposed beneath the lower end of the insulating cylinder 10 seals the cylinder to the hood 23'. The upper, reduced diameter end of electrode 2 has a first, electrically insulating caplike member 32 disposed thereover, member 32 being rigid. Telescoped over member 32 is a further caplike member 8 made of flexible elastic electrically insulating material. The rounded lower end 35 of plastic screw 16, which engages the upper central part of member 8, is thus doubly insulated from the electrode 2, first by member 8, and secondly by member 32. Member 8 has an annular outer flange on the lower end thereof, such flange being held under a radially inwardly projecting annular flange at the upper end of the elastic cylinder 10.

The start-up device of the invention functions as follows:

After the plasmatron has been supplied wih plasma-forming gas, after cooling water has been supplied to a channel 36 in the body thereof, and after the electrical feed voltage supply has been connected to the plasmatron, the non-metallic cap 13 is turned so that the inner ends of screws 15 travel along the horizontal part of the r-shaped channels 12, overcoming the resistance of the conical torque spring 17. When the ends of the screws 15 reach the vertical parts of the r-shaped channels 12, the non-metallic cap 13 is pushed downwardly. The electrode 2 with the non-melting tip 3 which is electrically connected to the anode 31, moves downwardly so that the tip 3 thereof protrudes into the passage 27b and finally comes into contact with the cathode 24 of the plasmatron. During such downward movement of the electrode 2 the flexible electrically insulating hood 8 is elastically deformed, whereas the inner hood 32 slides with respect to the upper end of the hollow cylinder 1. When the downward force is relieved from the cap 13, the cap 13 together with the electrode 2 are returned to their upper position by the spring 4 and spring 17 turns such parts counterclockwise into their locked position. As the electrode tip 3 moves away from the cathode 24 of the plasmatron, the plasma arc is initiated between the cathode 24 and the electrode tip 3. Such arc is blown by the plasma-forming gas which flows between the anode 19 and the cathode 24 toward the opening 30 in the plasmatron. The arc once initiated continues to be formed so long as the plasmatron performs its usual working cycle. When the electrode 2 reaches its upper terminal position, the torque spring 17 turns the cap 13 to cause the radially inner ends of the screws 15 to travel into the horizontal parts 12b of the r-shaped slots 12 until they reach their terminal positions. The cap 13 and the electrode 2 are thus now locked against unintended operation.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. In a plasmatron having an anode and cathode spaced from each other so as to sustain an arc therebetween, a nozzle disposed forwardly of the anode and cathode, and means to supply a stream of gas under pressure which flows between the anode and cathode and out of the nozzle, a manual start-up device comprising an electrically conductive plunger constituting a start-up electrode slidably mounted in and in electrical contact with a first one of said anode and cathode for selective advance movement toward and retraction from the second one of said anode and cathode, a first resilient means opposing the advance of the start-up electrode toward the second one of said anode and cathode, whereby to create an arc when the start-up electrode is retracted, away from the second one of said anode and cathode, from its fully advanced position, means mounting the start-up electrode, said start-up electrode mounting means being rotatable to a limited degree when it is in its retracted position, means automatically releasably locking the start-up electrode into its retracted position comprising a second resilient means constantly urging the start-up electrode mounting means and the electrode toward the terminus of their rotation wherein the start-up electrode mounting means and the start-up electrode are locked against axial movement, the means mounting the start-up electrode having an electrically insulated manually engageable means, whereby the start-up electrode mounting means and the start-up electrode may be turned against the action of the second resilient means to a position in which they are free for axial movement toward the second one of said anode and cathode.

2. The combination according to claim 1, wherein the means for automatically releasably locking the start-up electrode into its retracted position is a bayonet locking means, and comprising reciprocable and rotatable means mounting the start-up electrode, a bayonet slot in a fixed member, said bayonet slot having a first part extending parallel to the longitudinal axis of the start-up electrode and a second, transverse part having a first end communicating with the other end of the first part of the slot and a second, closed end, and a projection on the electrode mounting means extending into said slot.

3. The combination according to claim 2, comprising a second, torque spring which constantly urges the start-up electrode mounting means to rotate the projection thereon towards the end of the second part of the bayonet slot.

* * * * *